2,382,672

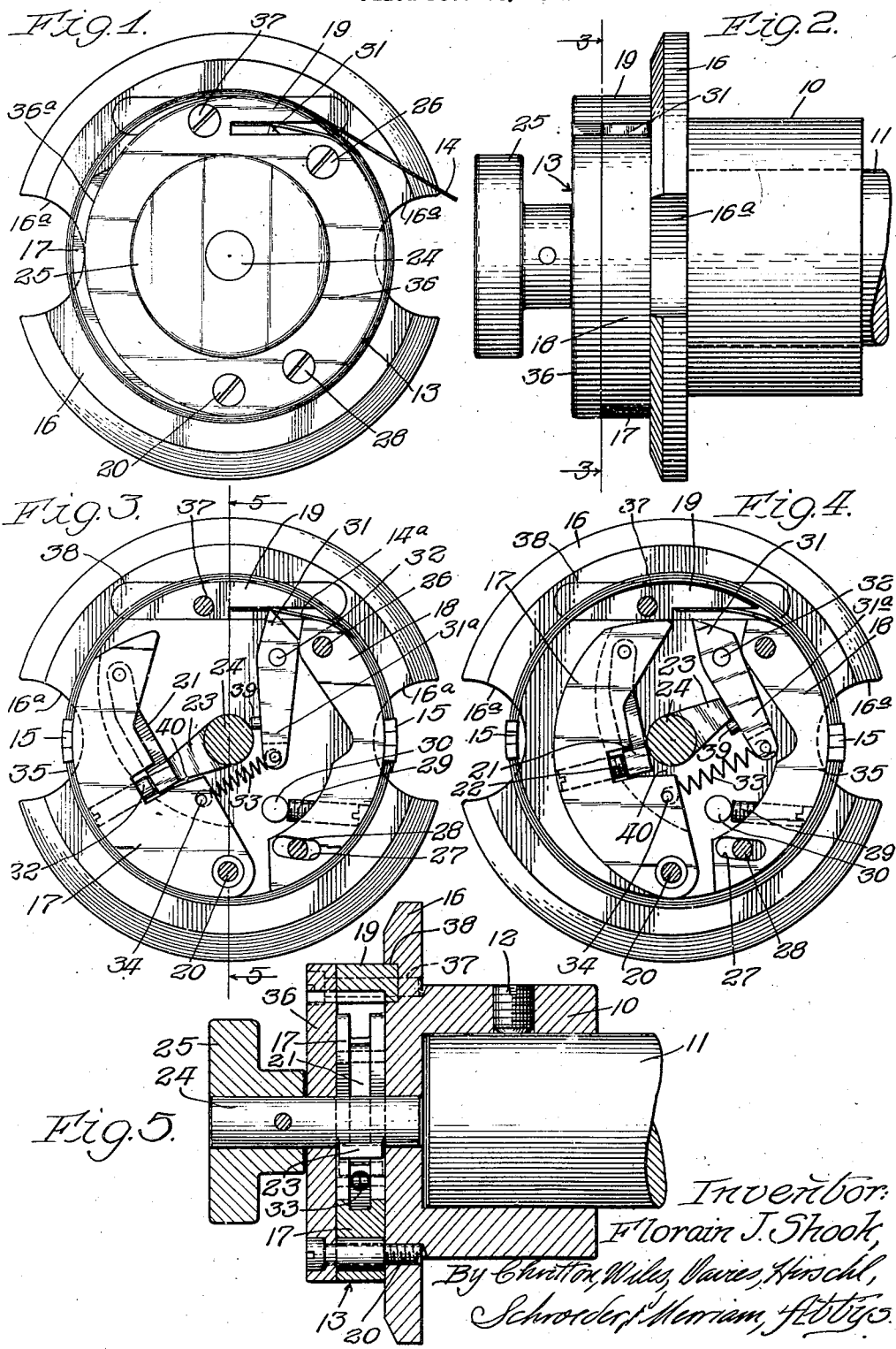
Aug. 14, 1945.     F. J. SHOOK     2,382,672
TIRE BEAD FORMER
Filed Dec. 24, 1942
Inventor:
Florain J. Shook, Patented Aug. 14, 1945

UNITED STATES PATENT OFFICE 2,382,672

TIRE BEAD FORMER

Florain J. Shook, Akron, Ohio, assignor to National-Standard Company, a corporation of Michigan Application December 24, 1942, Serial No. 469,987

2 Claims. (Cl. 154—9)

This invention relates to improvements in tire bead formers and more especially such a device adapted for forming the beads for small tires such as are commonly used, for example, on airplanes.

Among the features of my invention is the provision of such a device that may be relatively cheaply manufactured; and a device that is simple in construction and operation.

Another feature of my invention is the provision of a bead former provided with a movable gripper and a collapsing section adapted for simultaneous operation by a single control, thus speeding up the operation of forming a tire bead and removing the same from the former.

Other features and advantages of the invention will appear more fully as I proceed with the specification.

In that form of device embodying the features of the invention, shown in the accompanying drawing, Figure 1 is a view in front elevation; Figure 2 is a view in side elevation; Figure 3 is a view taken as indicated by the line 3 of Figure 2; Figure 4 is a view similar to Figure 3 showing the parts in altered positions; and Figure 5 is a view taken as indicated by the line 5 of Figure 3.

In general my device includes a drum or mandrel about which the wire braid, tape or other reinforcement is wound to form the bead. For the smaller tires this drum may have a diameter, for example, of about 3 inches. The drum has an inwardly movable or collapsing section adapted to be moved inwardly to release the bead from the drum after the same has been wound. There is also an adjusting section to permit adjustment of the drum to the exact size. There is also a gripper operating against an anvil or gripper block for holding the end of the tape at the commencement of the winding. A single cam operated by a manually controlled knob is provided for simultaneously operating the collapsing section and the gripper. With the cam in one position the gripper is closed to engage the end of the tape and the collapsing section is in its outer or normal position for the winding of the bead. In its other position, the cam releases the gripper and permits a spring to pull the collapsing section inwardly to releasing position, thus permitting removal of the completed bead from the drum.

As shown in the drawing, the former may comprise a hub 10 mounted on the shaft 11 by the set screw 12. The shaft 11 may be rotatable if desired to aid in winding the bead.

13 indicates in general the drum upon which the wire tape or other reinforcement 14 is wound. This kind of tape is well known in the art and need not be described in detail here. For example, it may comprise a well known braided or woven wire tape which is ordinarily embedded in rubber or rubber compound to make a flat rubberized ribbon reinforced by the wires embedded therein. In forming the bead, ordinarily two or more convolutions of the tape are wound upon the drum with the ends overlapping to form a grommet; and the various convolutions of the tape may be held in position by short pieces of adhesive tape 15 wound about the same at the ends of the reinforcement.

The outer end of the hub 10 is provided with the face plate 16 which serves to carry the various sections of the drum 13 and the other parts of the former to be hereinafter described. The drum 13 is formed of three principal sections, namely, the collapsing section 17, the adjusting section 18, and the gripper block or anvil section 19. The first mentioned sections 17 and 18 each extend through substantially 120° of the circumference of the drum 13 and the gripper block 19 extends through substantially 100° of such circumference. The remaining extent of the circumference is accounted for by relatively small gaps or spaces between the three sections.

The collapsing section 17 is pivoted on the screw 20 and provided with an adjusting bar 21 adapted to be set by the adjusting screw 22 to the desired position. This adjusting bar 21 is adapted to be engaged by the operating lever or cam 23 on the shaft 24 controlled by the knurled handle 25.

The adjusting section 18 is pivoted on the fulcrum 26 and its free end is provided with a slot 27 embracing a locking screw 28 so that it may be held in its adjusted position. It is also provided with an adjusting screw 29 operating against the stop pin 30 in order to permit fine adjustment.

31 indicates a gripper pivoted at 32 and adapted to cooperate with the underside of the gripper block or anvil 19 for gripping the end 14a of the tape 14. This gripper is urged into gripping position by the spiral spring 33 having one end attached to its end 31a and the other end attached at 34 to the collapsing section 17 urging said collapsing section into collapsed or releasing position except when it is held in open position by engagement of the cam 23 with the adjusting bar 21 as shown in Figure 3.

When the shaft 24 is turned substantially 180° in a clockwise direction to the position shown in Figure 4, the cam 23 becomes disengaged from the adjusting bar 21 on the collapsing section permitting the spring 33 to swing such collapsing section inwardly to releasing position, as shown in Figure 4; and said cam 23 also engages the end 31a of the gripper 31 causing it to swing in a counterclockwise direction on the fulcrum 32 to release the end of the tape 14a. The gripper is shown in its releasing position in Figure 4. When the parts are in the positions shown in Figure 4, the completed bead 35 may be removed from the former.

36 indicates a cover plate held in position by the screws 20, 28, 26 and 37. The latter screw 37 also serves to hold the gripper block 19 which is additionally supported in the recess 38 in the face plate 16. The cover plate 36 is cut away slightly through about half of its periphery, as indicated by 36a, in order to permit more easy removal of the completed bead from the drum 13. The face plate 16 is provided with two diametrically opposed notches 16a, as shown in Figure 1, to permit manual removal of the grommet after it has been wound upon the drum 13.

39 indicates a stop pin on the gripper 31 to limit movement of the cam 23 in a clockwise direction, and the shoulder 40 on the collapsing section 17 limits rotation of such cam to substantially 180° in the reverse direction.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A device of the character set forth, comprising: a driven drum having a fixed section and a collapsible section pivotally mounted for radial inward movement from the normal periphery of said drum, the inner face of said fixed section serving as an anvil for a gripper arm; a gripper arm pivotally mounted in said drum to swing towards said anvil; a tension spring connecting said gripper arm and collapsible section together so as to urge the gripper arm to gripping position and said collapsible section inwardly from the periphery of the drum; and a manually oscillatable cam axially disposed within said drum, said cam being adapted in one position to engage and hold the gripper arm out of gripping position, and the cam in a rotationally opposed position being adapted to hold said collapsible section in the normal periphery of the drum.

2. A device of the character set forth, comprising: a driven drum having a fixed section and a collapsible section pivotally mounted for radial inward movement from the normal periphery of said drum, the inner face of said fixed section serving as an anvil for a gripper arm; a gripper arm pivotally mounted in said drum to swing towards said anvil; spring means urging said gripper arm into gripping position with the anvil; a cam-finger pivotally mounted on said collapsible section to be engaged by a cam; means for adjusting the travel of said cam-finger with respect to the collapsible section on which it is mounted; and a manually oscillatable cam axially disposed within said drum, said cam being adapted in one position to engage and hold the gripper arm out of gripping position, and the cam in a rotationally opposed position being adapted to hold said collapsible section in the normal periphery of the drum.

FLORAIN J. SHOOK.